(12) United States Patent
Himmelmann

(10) Patent No.: US 9,166,510 B1
(45) Date of Patent: Oct. 20, 2015

(54) SYSTEMS UTILIZING A CONTROLLABLE VOLTAGE AC GENERATOR SYSTEM

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 28 days.

(21) Appl. No.: 14/243,248

(22) Filed: Apr. 2, 2014

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| H02P 9/48 | (2006.01) |
| B60R 16/03 | (2006.01) |
| F02K 9/48 | (2006.01) |
| F02B 33/44 | (2006.01) |

(52) U.S. Cl.
CPC . *H02P 9/48* (2013.01); *B60R 16/03* (2013.01); *F02K 9/48* (2013.01); *H02K 7/1823* (2013.01)

(58) Field of Classification Search
USPC .............................................. 290/52; 60/608
See application file for complete search history.

(56) References Cited

U.S. PATENT DOCUMENTS

| | | | | |
|---|---|---|---|---|
| 3,447,740 A * | 6/1969 | Friberg et al. | ................. | 415/181 |
| 3,869,866 A * | 3/1975 | Timoney | ......................... | 60/607 |
| 4,745,755 A * | 5/1988 | Kawamura | ..................... | 60/608 |
| 4,798,257 A * | 1/1989 | Kawamura et al. | ........... | 180/165 |
| 4,850,193 A * | 7/1989 | Kawamura | ...................... | 60/608 |
| 4,878,347 A * | 11/1989 | Kawamura | ...................... | 60/608 |
| 4,882,905 A * | 11/1989 | Kawamura | ...................... | 60/608 |
| 4,894,991 A * | 1/1990 | Kawamura | ...................... | 60/608 |
| 4,901,530 A * | 2/1990 | Kawamura | ...................... | 60/608 |
| 4,955,199 A * | 9/1990 | Kawamura | ...................... | 60/608 |
| 4,958,497 A * | 9/1990 | Kawamura | ...................... | 60/608 |
| 4,958,708 A * | 9/1990 | Kawamura | ...................... | 60/608 |
| 5,088,286 A * | 2/1992 | Muraji | ........................... | 60/608 |
| 5,406,797 A * | 4/1995 | Kawamura | ...................... | 60/608 |
| 5,678,407 A * | 10/1997 | Hara | ................................ | 60/608 |
| RE36,609 E * | 3/2000 | Halimi et al. | ................... | 60/608 |
| 6,079,211 A * | 6/2000 | Woollenweber et al. | ....... | 60/612 |
| 6,256,993 B1 * | 7/2001 | Halimi et al. | ................... | 60/608 |
| 6,326,703 B1 * | 12/2001 | Clark | ............................. | 290/52 |
| 6,637,205 B1 * | 10/2003 | Ahmad et al. | .................. | 60/608 |
| 6,705,084 B2 * | 3/2004 | Allen et al. | ...................... | 60/608 |
| 6,880,337 B2 * | 4/2005 | Masuda | ........................ | 60/608 |
| 7,043,916 B2 * | 5/2006 | Masuda | ........................ | 60/608 |
| 7,367,189 B2 * | 5/2008 | Ishiwatari | ....................... | 60/608 |
| 7,385,332 B2 | 6/2008 | Himmelmann et al. | | |
| 7,425,119 B2 * | 9/2008 | Bolz | ............................. | 417/366 |
| 7,434,399 B2 * | 10/2008 | Ishiwatari | ....................... | 60/608 |
| 7,478,533 B2 * | 1/2009 | Ueno | .............................. | 60/608 |

(Continued)

*Primary Examiner* — Pedro J Cuevas
(74) *Attorney, Agent, or Firm* — Locke Lord LLP; Scott D. Wofsy; Joshua L. Jones

(57) ABSTRACT

A rocket propelled vehicle includes a controllable voltage AC generator configured to be connected to a power generation turbine shaft and configured to convert rotational energy to electrical energy, wherein the controllable voltage AC generator is configured to output a desired voltage irrespective of a change in a rotational speed of the power generation turbine shaft, an AC electric motor pump configured to pump at least one of fuel or oxidizer to a combustion chamber of the rocket propelled vehicle, and an AC bus connecting the controllable voltage AC generator to each of the AC electric motor pump.

15 Claims, 3 Drawing Sheets

(56) References Cited

U.S. PATENT DOCUMENTS

| | | | |
|---|---|---|---|
| 7,863,767 B2* | 1/2011 | Chapple et al. | 290/54 |
| 8,051,661 B2* | 11/2011 | Igarashi et al. | 60/608 |
| 8,087,401 B2* | 1/2012 | Inoue et al. | 123/559.1 |
| 8,143,732 B2* | 3/2012 | Algrain | 290/1 A |
| 8,205,450 B2* | 6/2012 | Barthelet | 60/608 |
| 8,495,875 B2* | 7/2013 | Triller et al. | 60/608 |
| 8,958,971 B2* | 2/2015 | Hofbauer | 701/103 |
| 2003/0005695 A1* | 1/2003 | Allen et al. | 60/608 |
| 2004/0093867 A1* | 5/2004 | Masuda | 60/608 |
| 2004/0194466 A1* | 10/2004 | Kawamura et al. | 60/612 |
| 2005/0144947 A1* | 7/2005 | Masuda | 60/608 |
| 2006/0123784 A1* | 6/2006 | Algrain | 60/608 |
| 2006/0180130 A1* | 8/2006 | St. James | 123/559.1 |
| 2006/0196182 A1* | 9/2006 | Kimoto et al. | 60/605.1 |
| 2006/0196183 A1* | 9/2006 | Isogai | 60/607 |
| 2006/0260304 A1* | 11/2006 | Ishiwatari | 60/599 |
| 2006/0260305 A1* | 11/2006 | Ishiwatari | 60/599 |
| 2009/0000298 A1* | 1/2009 | Barthelet | 60/608 |
| 2009/0019852 A1* | 1/2009 | Inoue et al. | 60/608 |
| 2009/0140522 A1* | 6/2009 | Chapple et al. | 290/43 |
| 2010/0051363 A1* | 3/2010 | Inoue et al. | 180/65.26 |
| 2010/0275890 A1* | 11/2010 | McDonald-Walker | 123/564 |
| 2011/0036089 A1* | 2/2011 | Triller et al. | 60/608 |
| 2012/0121447 A1* | 5/2012 | Hayashi et al. | 417/410.1 |
| 2013/0213037 A1* | 8/2013 | Kitsukawa et al. | 60/608 |
| 2013/0239568 A1* | 9/2013 | Krishnan et al. | 60/608 |
| 2013/0255251 A1* | 10/2013 | Tanaka et al. | 60/605.2 |

* cited by examiner

SYSTEMS UTILIZING A CONTROLLABLE VOLTAGE AC GENERATOR SYSTEM

BACKGROUND

1. Field

The present disclosure relates to systems using electric motors, more specifically to AC electric motors used in a vehicle.

2. Description of Related Art

Rocket propelled vehicles can include fuel and oxidizer pumps that are mechanically linked to a power generation turbine which is powered by exhaust gas from a separate combustion chamber not associated with the main rocket engine combustor. The pumps can be mechanically connected to the power generation turbine via a gear train. In this case, the speed of each pump is proportional to the speed of the power generation turbine which is variable, thus the speed of each pump is controlled by changing the rotational speed of the power generation turbine. With this type of mechanical power transmission architecture, the rotational speed of the pumps cannot be independently controlled. Moreover, the mechanical system that links the pumps to the power generation turbine is heavy and requires the pumps to be located near the power generation turbine. In some situations, the oxidizer pump and the fuel pump can be mounted on the same rotating shaft as the power generation turbine. This architecture does not have the complexity of the geared rocket turbo-pump architecture described above, however, the efficiency of the pumps and the power generation turbine are reduced, since each component is forced to operate at the same rotational speed.

It would be possible to power electrically driven AC powered pumps with an AC-DC-AC conversion system that is configured to control the speed of each pump independently of the speed of the power generation turbine, however, such a system would add substantial weight to the rocket propelled vehicle and would not necessarily be beneficial over a mechanical system.

Such conventional methods and systems have generally been considered satisfactory for their intended purpose. However, there is still a need in the art for a system that allows for the efficient use of electric motor pumps in a rocket propelled vehicle. The present disclosure provides a solution for this problem.

SUMMARY

A system for powering a pump in a rocket propelled vehicle includes a controllable voltage AC generator that is configured to be connected to a power generation turbine shaft and is configured to convert rotational energy to electrical energy. The controllable voltage AC generator is configured to output a desired voltage irrespective of a change in a rotational speed of the power generation turbine shaft. An AC electric motor pump is configured to pump at least one of fuel or oxidizer to a combustion chamber of the rocket propelled vehicle. An AC electric bus connects the controllable voltage AC generator to the AC electric motor which drives the pump.

In some embodiments, the system can further include a power generation turbine operatively connected to the controllable voltage AC generator and configured to convert energy of an exhaust gas to rotational energy of a power generation turbine shaft.

The system can further include a controller configured to control the controllable voltage AC generator to output the desired voltage. The controller can have a feedback system for determining a fluid flow or a speed of the AC electric motor pump and can modify the voltage of the controllable voltage AC generator to achieve a desired fluid flow or pump speed.

In certain embodiments, the system can further include both an AC electric fuel pump and an AC electric oxidizer pump and a respective controllable voltage generator for each pump. Each controllable voltage generator can be coaxially disposed on or geared to the power generation turbine shaft or in any other suitable manner.

In some embodiments, the fuel pump can be disposed proximate to a fuel tank. The oxidizer pump can be disposed proximate to an oxidizer tank or in any other suitable manner. In some embodiments, one of the pumps can be coaxially disposed on or geared to the power generation turbine shaft or the controllable voltage AC generator such that the pump is mechanically driven, and the other pump is driven electrically by the controllable voltage AC generator.

In at least one aspect of this disclosure, a method includes controlling an output voltage of a controllable voltage generator attached to a power generation turbine of a rocket propelled vehicle that is configured to convert energy of an exhaust gas to rotational energy of a power generation turbine shaft and allowing the controlled voltage generator to power an AC electric motor pump disposed in the rocket propelled vehicle. The AC electric motor pump can be any suitable electric motor pump (e.g., an induction motor and/or any other suitable electric motor pump that is configured to tolerate slip).

The method can further include determining a speed of the pump or a fluid flow rate of at least one of an oxidizer or fuel. In some embodiments, the method further includes increasing the output voltage if the pump speed or fluid flow rate is determined to be below a desired speed and/or decreasing the output voltage if the pump speed or fluid flow rate is determined to be above a desired speed.

The method can further include actuating the controllable voltage AC generator to produce a constant voltage in response to a change in power generation turbine shaft speed. In some embodiments, the method can further include controlling multiple AC electric motor pumps of the rocket propelled vehicle independently of each other. The method can further include controlling the speed of the AC electric motor pump of the rocket propelled vehicle independently of the speed of the power generation turbine shaft.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
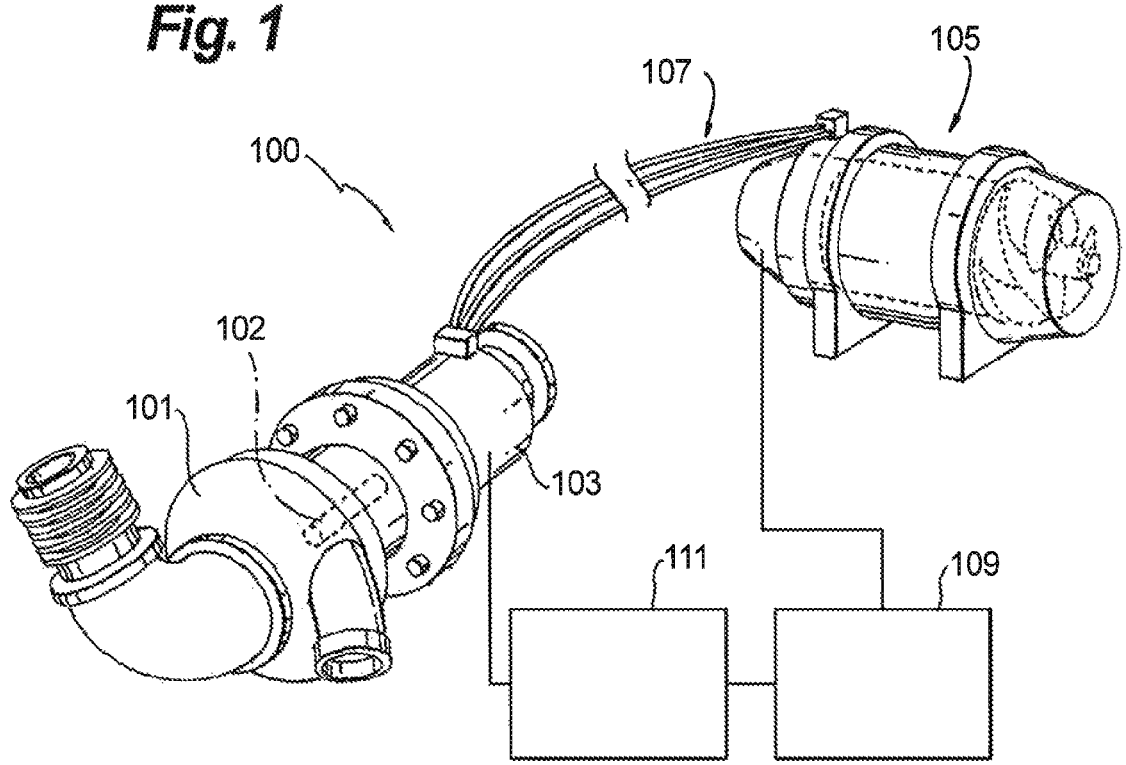
FIG. 1 is a partial, perspective view of an embodiment of a system in accordance with this disclosure.
Figure 2:
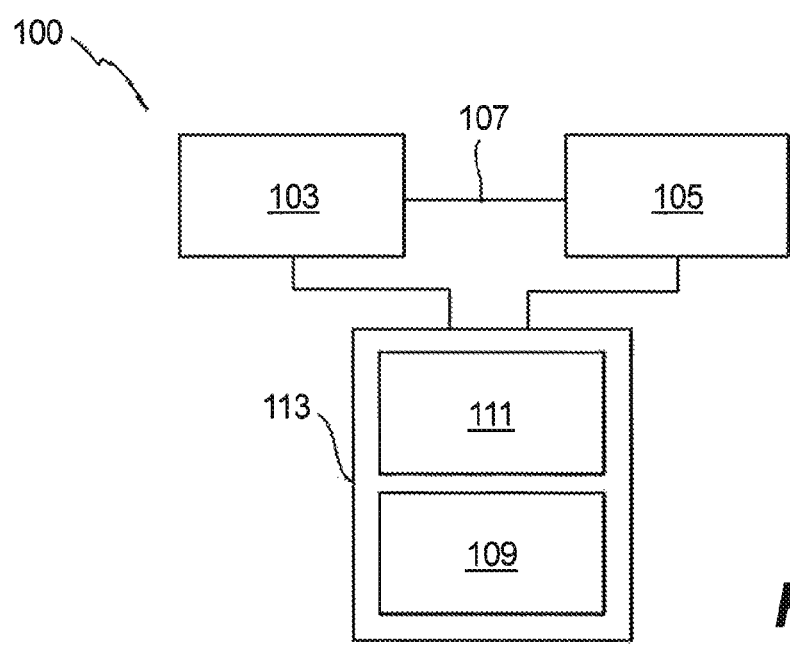
FIG. 2 is a schematic view of an embodiment of a system in accordance with this disclosure.

Reference will now be made to the drawings wherein like reference numerals identify similar structural features or aspects of the subject disclosure. For purposes of explanation and illustration, and not limitation, an exemplary embodiment of a system 100 in accordance with the disclosure is shown in FIG. 1. A systematic view of a system 100 is shown in FIG. 2 and is shown in a rocket propelled vehicle 300 in FIG. 3. The systems and methods disclosed herein can be used to control fuel and/or oxidizer supply in a rocket engine independent of turbine speed.

Referring to FIGS. 1 and 2, in at least one aspect of this disclosure, a system 100 includes a controllable voltage AC generator 103 that is configured to be connected to a power generation turbine shaft 102 of a power generation turbine 101 and is configured to convert rotational energy to electrical energy. The controllable voltage AC generator 103 can be any suitable controllable voltage generator configured to modify output voltage for a given rotation speed of the controllable voltage generator 103. For example, U.S. Pat. No. 7,385,332 to Himmelmann discloses a suitable type of controllable voltage AC generator.

Non-limiting examples of a controllable voltage AC generator include: 1) a wound field machine that can have its excitation current (applied to the main stage rotor) increased or reduced to vary the amount of magnetic flux interacting with the main stage stator; 2) An induction generator that can increase or decrease the frequency of the excitation field (thereby changing the slip rate), which then changes the magnetic flux on the rotor, thereby changing the main stage output voltage; 3) a permanent magnet machine that can have the rotor axially displaced out of the stator thereby changing the effective stack length of the machine, which changes the amount of rotor flux reacting with the stator, thereby altering the output voltage; 4) a permanent magnet machine that can have a metal sleeve partially or fully inserted between the rotor and the stator (a magnetic shutter) effectively short circuiting the magnetic flux on the rotor, thereby changing how much flux interacts with the stator, thereby altering the machine output voltage; 5) a permanent magnet machine that can have a two piece rotor, axially split such that one half of the rotor can be rotated relative to the other, thereby cancelling out some of the magnetic flux interacting with the stator, thereby altering the output voltage; and 6) a permanent magnet machine that can incorporate control windings in the stator that can cause saturation, or can re-direct the magnetic flux away from the main stator coils, thereby changing the main stator output voltage.

Figure 3:
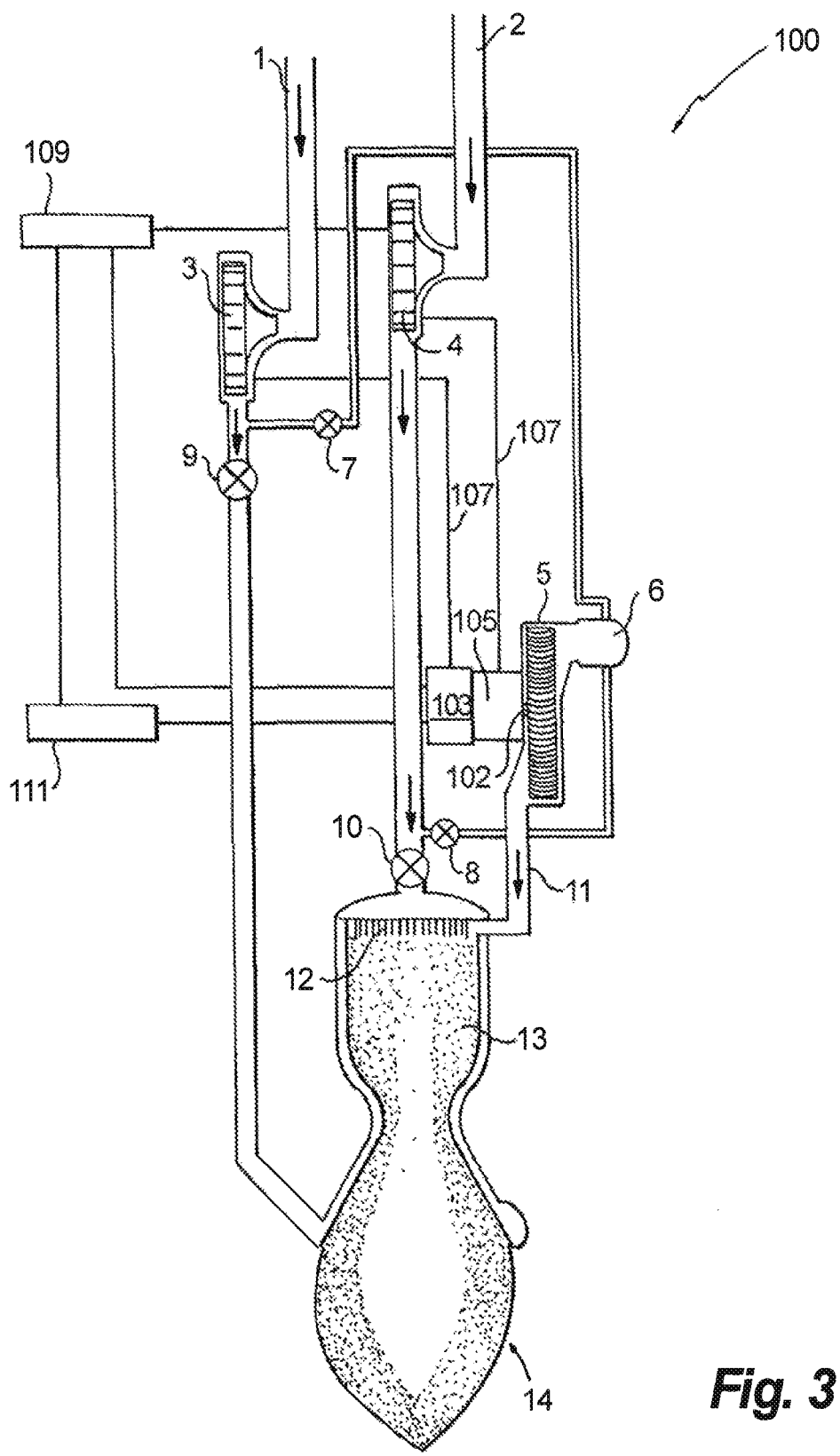
FIG. 3 is a schematic view of a portion of an embodiment of a rocket propelled vehicle in accordance with this disclosure.

The system 100 can further include at least one power generation turbine 101 configured to convert energy of an exhaust gas to rotational energy of a power generation turbine shaft 102 via the turbine blades. Referring additionally to FIG. 3, the power generation turbine 101 can be connected to its own turbine combustion chamber 6, and/or can be connected to an exhaust from the main combustion chamber 13.

The controllable voltage AC generator 103 can be configured to output a desired voltage irrespective of any change in rotational speed of the power generation turbine shaft 102. In this respect, the generator 103 can output a desired voltage even if the speed of the power generation turbine 101 changes due to fluctuating exhaust gas flow and/or other reasons.

The system 100 further includes AC electric motor pump 105 configured to pump fuel and/or oxidizer to at least one combustion chamber 6, 13 (see FIG. 3) of the rocket propelled vehicle 300, and an AC bus 107 connecting the controllable voltage AC generator 103 to each of the AC electric motor pumps 105. The electric motor pump 105 can be any suitable electric motor pump configured to operate with alternating current (e.g., an induction motor and/or any other suitable electric motor configured to tolerate slip). The AC bus 107 can be any suitable connection to power the AC electric motor pump 105 (e.g., a three phase connection). The speed of the AC electric motor pump 105 can be monitored and/or limited by a pump controller 109 that is operatively connected to the pump 105 and/or one or more sensors (e.g., flow sensor, speed sensor) disposed therein via any suitable circuitry, hardware, and/or software.

The system 100 can further include a generator controller 111 configured to control the controllable voltage AC generator 103 to output the desired voltage. The generator controller 111 can have any suitable feedback system and/or be configured to communicate with the pump controller 109 such that the generator controller can determine a fluid flow or a speed of the AC electric motor pump 105. The generator controller 111 is further configured to modify the voltage of the controllable voltage AC generator 103 to achieve a desired fluid flow and/or pump speed.

The generator controller 111 can be configured to modify the output voltage in accordance with a predetermined algorithm implemented via any suitable circuitry, hardware, or software, or via any other suitable program. For example, if the generator controller 111 or pump controller 109 determines that fluid flow is insufficient, then the generator controller 111 can modify the controllable voltage AC generator 103 to output a higher voltage, and vice versa. The generator controller 111 can also be connected to the turbine 101 to determine a change in rotational speed of the turbine 101 such that the generator controller 111 can modify the output voltage setting of the generator 103 to maintain a constant/desired voltage output and/or anticipate the fluctuations of the turbine 101.

Referring to FIG. 2, a master controller 113 can include be included in system 100 such that the master controller 113 includes both the pump controller 109 and the generator controller 111 implemented as software modules.

Referring additionally to FIG. 3, the system 100 is shown implemented in a rocket propelled vehicle 300. The vehicle 300 can further include both an AC electric fuel pump 3 and an AC electric oxidizer pump 4 and a controllable voltage generator 103 for each pump. Each controllable voltage generator 103 can be coaxially disposed on the power generation turbine shaft 102 or in any other suitable manner. For example, the generators could also be connected to the turbine via a gearbox, or chains, belts, friction drives, etc.

The fuel pump 3 can be disposed proximate to a fuel tank as oppose to close to the turbine 101 since the fuel pump 3 no longer needs to be mechanically linked to the turbine 101. The oxidizer pump 4 can also or alternatively be disposed proximate to an oxidizer tank in a similar manner for similar reasons.

Figure 4:
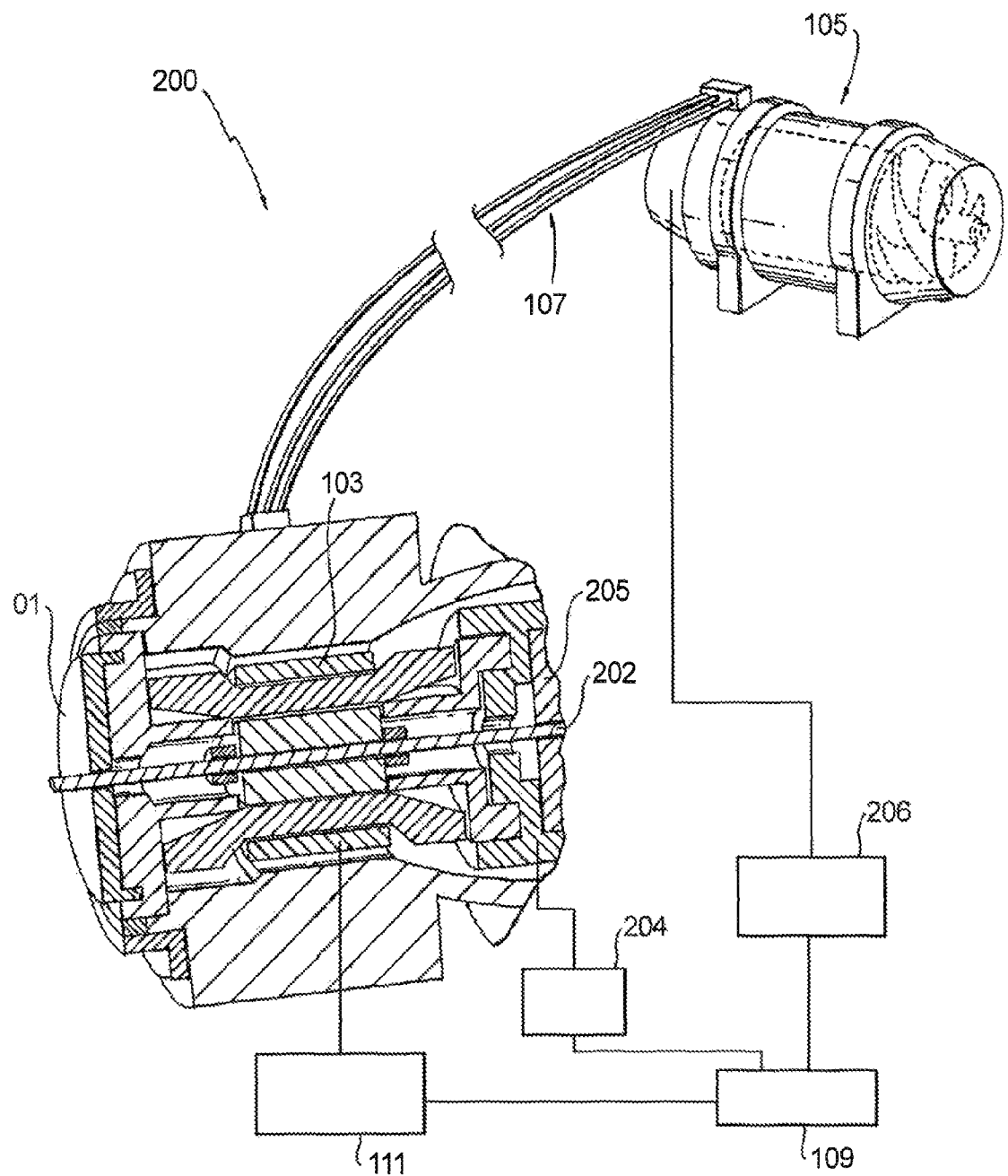
FIG. 4 is a partial, perspective view of an embodiment of a system in accordance with this disclosure, showing one pump disposed coaxially with a generator and another electrically connected to the generator.

In another embodiment, as shown in FIG. 4, a pump 205 (e.g., an impeller) can be disposed on the turbine shaft 202 of a turbine 201 along with one or more generators 103. A second pump (e.g., electric motor pump 105) can be located near its tank. In such an embodiment, varying the speed of the turbine 201 can control the speed of pump 205, while the voltage control generator 103 can vary the speed of the electric motor pump 105 independently of the speed of the turbine 201. This allows for a system where both pumps 105, 205 can have independently variable speed, while only needing to carry the mass and complexity of one generator 103 and one electric motor for the electric motor pump 105.

As shown in FIG. 4, pump controller 109 can also be configured to also receive signals from a first pressure sensor 204 and/or a second pressure sensor 206 to determine a pressure of a fluid flow provided by the pumps 105, 205 (e.g., a fuel pressure and/or and oxidizer pressure)

In some embodiments, as shown in FIG. 3, the generator controller 111 can be configured to provide differing voltages to operate the fuel pump 3 and oxidizer pump 4 independently of each other at different and/or the same speeds (e.g., one pump could be held at a constant speed while the other is changed to a variable speed).

In some embodiments, the generator 103 can be configured to allow inclusion of a suitable active and/or passive rectifier that can siphon some of the electric power from the electric turbo-pump system, allowing it to be used to power other pieces of equipment on the vehicle.

In at least one aspect of this disclosure, a method includes controlling an output voltage of a controllable voltage generator 103 attached to a power generation turbine 101 of a rocket propelled vehicle 300 that is configured to convert energy of an exhaust gas to rotational energy of a power generation turbine shaft 102, and allowing the controlled voltage to power an AC electric motor pump 105 disposed in the rocket propelled vehicle 300.

The method can further include determining a speed of the pump 105 or a fluid flow rate of at least one of an oxidizer or fuel. In some embodiments, the method further includes increasing the output voltage if the pump speed or fluid flow rate is determined to be below a desired speed and/or decreasing the output voltage if the pump speed or fluid flow rate is determined to be above a desired speed.

The method can further include actuating the controllable voltage AC generator 103 to produce a constant voltage in response to a change in power generation turbine shaft 102 speed. In some embodiments, the method can further include controlling multiple AC electric motor pumps 105 of the rocket propelled vehicle 300 independently of each other. The method can further include controlling the speed of the AC electric motor pump 103 of the rocket propelled vehicle 300 independently of the speed of the power generation turbine shaft 102.

Embodiments of methods and systems of the present disclosure, as described above and shown in the drawings, provide for a rocket propelled vehicle with superior properties including controllable fuel supply and/or oxidizer independent of turbine speed. The systems and methods disclosed herein can also provide for a rocket engine that can be started and stopped multiple times. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for powering a pump in a rocket propelled vehicle, comprising:
a controllable voltage AC generator configured to be connected to a power generation turbine shaft and configured to convert rotational energy to electrical energy, wherein the controllable voltage AC generator is configured to output a desired voltage irrespective of a change in a rotational speed of the power generation turbine shaft;
an AC electric motor pump configured to pump at least one of fuel or oxidizer to a combustion chamber of the rocket propelled vehicle; and
an AC bus connecting the controllable voltage AC generator to the AC electric motor pump.

2. The system of claim 1, further comprising a controller configured to control the controllable voltage AC generator to output the desired voltage.

3. The system of claim 2, wherein the controller includes a feedback system for determining a fluid flow or a speed of the AC electric motor pump and can modify the voltage of the controllable voltage AC generator to achieve a desired fluid flow or pump speed.

4. The system of claim 1, further comprising a power generation turbine operatively connected to the controllable voltage AC generator and configured to convert energy of an exhaust gas to rotational energy of a power generation turbine shaft.

5. The system of claim 1, further including:
both an AC electric fuel pump and an AC electric oxidizer pump; and
a controllable voltage generator for each pump.

6. The system of claim 5, wherein the fuel pump is disposed proximate to a fuel tank.

7. The system of claim 5, wherein the oxidizer pump is disposed proximate to an oxidizer tank.

8. The system of claim 5, wherein one of the pumps is coaxially disposed on or geared to the power generation turbine shaft or the controllable voltage AC generator such that the pump is mechanically driven, and the other pump is driven electrically by the controllable voltage AC generator.

9. A method, comprising:
controlling an output voltage of a controllable voltage generator attached to a power generation turbine of a rocket propelled vehicle that is configured to convert energy of an exhaust gas to rotational energy of a power generation turbine shaft; and
allowing the controlled voltage to power an AC electric motor pump disposed in the rocket propelled vehicle.

10. The method of claim 9, further comprising determining a speed of the pump or a fluid flow rate of at least one of an oxidizer or fuel.

11. The method of claim 10, further comprising increasing the output voltage if the pump speed or fluid flow rate is determined to be below a desired speed.

12. The method of claim 10, further comprising decreasing the output voltage if the pump speed or fluid flow rate is determined to be above a desired speed.

13. The method of claim 9, further comprising actuating the controllable voltage AC generator to produce a constant voltage in response to a change in power generation turbine shaft speed.

14. The method of claim 9, further comprising controlling multiple AC electric motor pumps of the rocket propelled vehicle independently of each other.

15. The method of claim 9, further comprising controlling the speed of the AC electric motor pump of the rocket propelled vehicle independently of the speed of the power generation turbine shaft.

* * * * *